United States Patent
Lenga et al.

(10) Patent No.: US 12,412,280 B2
(45) Date of Patent: Sep. 9, 2025

(54) MEDICAL IMAGE SEGMENTATION AND ATLAS IMAGE SELECTION

(71) Applicant: KONINKLIJKE PHILIPS N.V., Eindhoven (NL)

(72) Inventors: Matthias Lenga, Mainz (DE); Tobias Wissel, Lubeck (DE); Rolf Juergen Weese, Norderstedt (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 371 days.

(21) Appl. No.: 17/780,974

(22) PCT Filed: Dec. 7, 2020

(86) PCT No.: PCT/EP2020/084860
§ 371 (c)(1),
(2) Date: May 28, 2022

(87) PCT Pub. No.: WO2021/116011
PCT Pub. Date: Jun. 17, 2021

(65) Prior Publication Data
US 2023/0005158 A1  Jan. 5, 2023

(30) Foreign Application Priority Data
Dec. 10, 2019 (EP) .................................... 19214693

(51) Int. Cl.
*G06T 7/168* (2017.01)
*G06T 7/37* (2017.01)

(52) U.S. Cl.
CPC ................ *G06T 7/168* (2017.01); *G06T 7/37* (2017.01); *G06T 2207/10081* (2013.01); *G06T 2207/20081* (2013.01); *G06T 2207/20084* (2013.01); *G06T 2207/30056* (2013.01); *G06T 2207/30084* (2013.01)

(58) Field of Classification Search
CPC .................................. G06T 7/168; G06T 7/37
See application file for complete search history.

(56) References Cited

U.S. PATENT DOCUMENTS

| | | | |
|---|---|---|---|
| 2014/0247977 A1 | 9/2014 | Han | |
| 2016/0292859 A1* | 10/2016 | Magda | ..................... G06T 7/149 |
| 2021/0027468 A1* | 1/2021 | Madabhushi | ............. G06T 7/40 |
| 2022/0012902 A1* | 1/2022 | Madabhushi | .......... G16H 50/20 |

FOREIGN PATENT DOCUMENTS

CN  109509193 A  *  3/2019  ............... G06T 7/11

OTHER PUBLICATIONS

PCT International Search Report, International application No. PCT/EP2020/084860, Feb. 19, 2021.

(Continued)

*Primary Examiner* — David Bilodeau (57) ABSTRACT

Some embodiments are directed to a segmentation of medical images. For example, a medical image may be registering to multiple atlas images after which a segmentation function may be applied. Multiple segmentation may be fused into a final overall segmentation. The atlas images may be selected on the basis of high segmentation quality or low registration quality.

15 Claims, 7 Drawing Sheets

(56) References Cited

OTHER PUBLICATIONS

Yang H. et al., "Neural Multi-Atlas Label Fusion: Application to Cardiac MR Images", arxiv.org, Cornell University Library, 201 Olin Library Cornell University Ithaca, NY 14853, Sep. 27, 2017 (Sep. 27, 2017), XP081414624.
Zhao Yu et al., "Knowledge-Aided Convolutional Neural Network for Small Organ Segmentation", IEEE Journal of Biomedical and Health Informatics, IEEE, Piscataway, NJ, USA, vol. 23, No. 4, Jul. 1, 2019 (Jul. 1, 2019), pp. 1363-1373, XP011733355.
Sabuncu M.R. et al., "A Generative Model for Image Segmentation Based on Label Fusion", IEEE Transactions on Medical Imaging, IEEE Service Center, Piscataway, NJ, US, vol. 29, No. 10, Oct. 1, 2010 (Oct. 1, 2010), pp. 1714-1729, XP011311761.
Tajbakhsh N. et al., "Convolutional Neural Networks for Medical Image Analysis: Full Training or Fine Tuning?", IEEE Transactions on Medical Imaging, vol. 35, No. 5, pp. 1299-1312, May 2016.
Iglesias J. E. et al., "Multi-Atlas Segmentation of Biomedical Images: A Survey", Medical Image Analysis, vol. 24, No. 1, pp. 205-219, 2015.
Brosch T. et al., "Foveal Fully Convolutional Nets for Multi-Organ Segmentation", SPIE Proceedings vol. 10574, Medical Imaging 2018: Image Processing; 105740U (2018).
Sotiras A. et al., "Deformable Medical Image Registration: A Survey", IEEE Transactions on Medical Imaging, vol. 32, No. 7, pp. 1153-1190, Jul. 2013.
Avants B. B. et al., "Symmetric Diffeomorphic Image Registration with Cross-Correlation: Evaluating Automated Labeling of Elderly and Neurodegenerative Brain", Medical Image Analysis, vol. 12, No., pp. 26-41, 2007.
Vakalopoulou M. et al., "AtlasNet: Multi-Atlas Non-Linear Deep Networks for Medical Image Segmentation", Conference on Medical Imaging Computing and Computer-Assisted Intervention, Sep. 2018, Granada, Spain.
Ronneberger O. et al., "U-Net: Convolutional Networks for Biomedical Image Segmentation", May 2015.
Hansch A. et al., "Evaluation of Deep Learning Methods for Parotid Gland Segmentation from CT Images", Journal of Medical Imaging, vol. 6, No. 1, pp. 011005-1-011005-9, Jan.-Mar. 2019.
Groza V. et al., "Comparison of Deep Learning-Based Techniques for Organ Segmentation in Abdominal CT Images", 1st Conference on Medical Imaging with Deep Learning (MIDL), Amsterdam, The Netherlands, Apr. 2018.

* cited by examiner

MEDICAL IMAGE SEGMENTATION AND ATLAS IMAGE SELECTION

CROSS-REFERENCE TO PRIOR APPLICATIONS

This application is the U.S. National Phase application under 35 U.S.C. § 371 of International Application No. PCT/EP2020/084860, filed on Dec. 7, 2020, which claims the benefit of European Patent Application No. 19214693.4, filed on Dec. 10, 2019. These applications are hereby incorporated by reference herein.

FIELD OF THE INVENTION

The presently disclosed subject matter relates to a method for medical image segmentation, a method for selecting atlas images for use in a medical image segmentation method, a medical image segmentation system, an atlas images selecting system, and a computer readable medium.

BACKGROUND OF THE INVENTION

Accurate and robust medical image segmentation is still a challenging task.

One approach to medical image segmentation are multi-atlas based image segmentation methods. These methods, can be constructed with a limited set of segmented reference images, known as atlases. Unfortunately, atlas based methods often lack the desired accuracy. Examples, of registration methods and application thereof to medical image segmentation are given in "Deformable medical image registration: a survey", by A. Sotiras, et al., or in "Symmetric diffeomorphic image registration with cross-correlation: evaluating automated labeling of elderly and neurodegenerative brain", by B. B. Avants, et al., both articles being included herein by reference.

Another approach to medical image segmentation are neural networks, e.g., convolutional neural networks. Examples of neural networks suitable for medical image segmentation are given in the article "Comparison of deep learning-based techniques for organ segmentation in abdominal CT images", by Groza, et al., or in "Foveal fully convolutional nets for multi-organ segmentation", by T. Brosch, and A. Saalbach, both articles being included herein by reference.

A neural network based approach enables the efficient construction of accurate segmentation algorithms. Unfortunately, neural networks do not generalize properly to new datasets with slightly different properties. When presenting a new image to a trained neural network that lies even slightly outside of the images that it was trained on, the resulting segmentation may be fully incorrect.

There is a desire for a medical image segmentation method that on the one hand allows for accurate segmentation but on the other hand generalizes better to unfamiliar images.

SUMMARY OF THE INVENTION

To address these and other issues medical segmentation methods are provided that use both a segmentation function and multiple atlas images. Furthermore, methods are provided for selecting atlas images for use in a medical image segmentation method. Furthermore, corresponding devices and software are provided.

Machine learning-based segmentation algorithms are obtained that produce accurate and robust segmentations of medical images, yet generalize well to new datasets with slightly different properties. The improved generalization may also be used to reduce the amount of training data.

By registering an image on an atlas image with which the segmentation function is familiar, e.g., on which the segmentation function performs well, it is likely that an accurate segmentation is obtained. It is avoided that the segmentation function is applied to images for which it will produce a failure-mode segmentation, e.g., showing a collapse of segmentation ability. By registering an image on multiple atlas images the probability that a majority of them will show a poor segmentation output is reduced, and the accuracy of the process is improved. It is avoided for example that accidental peculiarities of an atlas or input image will dominate the result. Combining a set of multiple predictors with a suitable voting scheme improves their predictive performance.

An advantage of embodiments of atlas image selection, is that the atlas image selection may be performed after training of the segmentation function is complete. In fact, the training of the segmentation function may be independent of the atlas image selection. This makes it possible to enhance existing segmentation functions according to an embodiment.

For example, in an embodiment, the segmentation function may be machine learning segmentation function. For example, training images may be used to train the segmentation function. For example, the segmentation function may be, e.g., a neural network, e.g., a convolutional neural network (CNN). Instead of a neural network, a machine learning segmentation function may be a decision forest. The machine learning segmentation function may be an ensemble of neural networks. For example, a final result may be composed from the results of the individual network responses in the ensemble. For example, the ensemble of neural networks may be trained with different parameters.

A subset of n training images may be selected as atlas images. To segment a new image, it is registered to the selected n atlas images, and the segmentation function is applied to registered images to obtain n segmentations. For example, these may be pixel or voxel segmentations. After applying to each of the n segmentations the corresponding inverse transformation, the resulting segmentation may be fused, e.g., using majority voting to obtain a final segmentation.

A method for segmentation and/or a method for selecting atlas images may be implemented on an electronic device, for example on a computer. The segmentation methods described herein may be applied in a wide range of practical applications, for example, in clinical workstations or web-/cloud-based clinical applications for diagnosis, quantification or treatment planning.

A person skilled in the art will appreciate that the method may be applied to multi-dimensional image data, e.g., to two-dimensional (2D), three-dimensional (3D) or four-dimensional (4D) images, acquired by various acquisition modalities such as, but not limited to, standard X-ray Imaging, Computed Tomography (CT), Magnetic Resonance Imaging (MRI), Ultrasound (US), Positron Emission Tomography (PET), Single Photon Emission Computed Tomography (SPECT), and Nuclear Medicine (NM).

An embodiment of the method may be implemented on a computer as a computer implemented method, or in dedicated hardware, or in a combination of both. Executable code for an embodiment of the method may be stored on a computer program product. Examples of computer program products include memory devices, optical storage devices, integrated circuits, servers, online software, etc. Preferably, the computer program product comprises non-transitory program code stored on a computer readable medium for performing an embodiment of the method when said program product is executed on a computer.

In an embodiment, the computer program comprises computer program code adapted to perform all or part of the steps of an embodiment of the method when the computer program is run on a computer. Preferably, the computer program is embodied on a computer readable medium.

BRIEF DESCRIPTION OF THE DRAWINGS

Further details, aspects, and embodiments will be described, by way of example, with reference to the drawings. Elements in the FIGS. are illustrated for simplicity and clarity and have not necessarily been drawn to scale. In the FIGS., elements which correspond to elements already described may have the same reference numerals. In the drawings, FIG. 1a schematically shows an example of an embodiment of a medical image segmentation system, FIG. 1b schematically shows an example of an embodiment of an atlas images selecting system, FIG. 2a schematically shows an example of an embodiment of a segmentation function, FIG. 2b schematically shows an example of an embodiment of an image segmentation, FIG. 2c schematically shows an example of an embodiment of a segmentation quality determination, FIG. 3 schematically shows an example of an embodiment of a method for medical image segmentation, FIGS. 4a and 4b schematically illustrate an example of an embodiment of a method for selecting atlas images for use in a medical image segmentation method, FIG. 5a schematically shows an example of an embodiment of a method for medical image segmentation, FIG. 5b schematically shows an example of an embodiment of a method for selecting atlas images for use in a medical image segmentation method, FIGS. 6a and 6b schematically show an example of an embodiment of a medical image, FIG. 6c schematically shows Dice scores for an example of an embodiment of a segmentation function operating correctly, FIG. 6d schematically shows Dice scores for an example of an embodiment of a segmentation function showing a failure mode, FIG. 7a schematically shows a computer readable medium having a writable part comprising a computer program according to an embodiment, FIG. 7b schematically shows a representation of a processor system according to an embodiment.

LIST OF REFERENCE NUMERALS 100 a machine learning system
110 a medical image segmentation system
112 a segmentation function storage
114 an atlas image storage
130 a processor system
140 a memory
150 a communication interface
160 an atlas images selecting system
164 a test image storage
170 a processor system
180 a memory
190 a communication interface
210 a segmentation function
212, 213 a medical input image
214, 215 an image segmentation
216 a true image segmentation
220 a comparator
217 a segmentation quality
320 multiple atlas images
321-323 an atlas image
312 a medical image
325 a registering function
330 multiple registered images
331-333 a registered image
340 multiple registered image segmentations,
341-343 a registered image segmentation
350 multiple deregistered image segmentations,
351-353 a deregistered image segmentation
361 an output segmentation
610 multiple test images
610' not yet selected test images
611-613 a test image
620 multiple test image segmentations
621-623 a test image segmentation
630 multiple segmentation qualities
631-633 a segmentation quality
651 an atlas image
640 multiple registration qualities
641-643 a registration quality
652, 654 a Dice score for the spine
662, 664 a Dice score for ribs
400 a method for medical image segmentation
410 obtaining a segmentation function, the segmentation function being configured to receive a medical input image and to produce an image segmentation,
420 obtaining multiple atlas images,
430 receiving a medical image,
440 registering the received image to the multiple atlas images thus obtaining multiple registered images and multiple corresponding registering transformations configured to register the received image on the multiple atlas images,
450 applying the segmentation function to the multiple registered images thus obtaining multiple registered image segmentations,
460 applying inverses of the multiple registering transformations to the multiple image segmentations thus obtaining multiple image segmentations,
470 determining an output segmentation from the multiple image segmentations.
500 a method for selecting atlas images for use in a medical image segmentation method,
510 obtaining a segmentation function configured to receive an input image and to produce an image segmentation,
520 obtaining multiple test images and corresponding test image segmentations,
530 determining a segmentation quality for the multiple test images by comparing the associated test image segmentation with an image segmentation generated by the segmentation function,
540 selecting one or more of the test images as atlas images having a segmentation quality over a threshold.
1000 a computer readable medium
1010 a writable part
1020 a computer program
1110 integrated circuit(s)

1120 a processing unit
1122 a memory
1124 a dedicated integrated circuit
1126 a communication element
1130 an interconnect
1140 a processor system

DETAILED DESCRIPTION OF EMBODIMENTS

While the presently disclosed subject matter is susceptible of embodiment in many different forms, there are shown in the drawings and will herein be described in detail one or more specific embodiments, with the understanding that the present disclosure is to be considered as exemplary of the principles of the presently disclosed subject matter and not intended to limit it to the specific embodiments shown and described.

In the following, for the sake of understanding, elements of embodiments are described in operation. However, it will be apparent that the respective elements are arranged to perform the functions being described as performed by them.

Further, the presently disclosed subject matter is not limited to the embodiments, as feature described herein or recited in mutually different dependent claims may be combined.

Figure 1A:
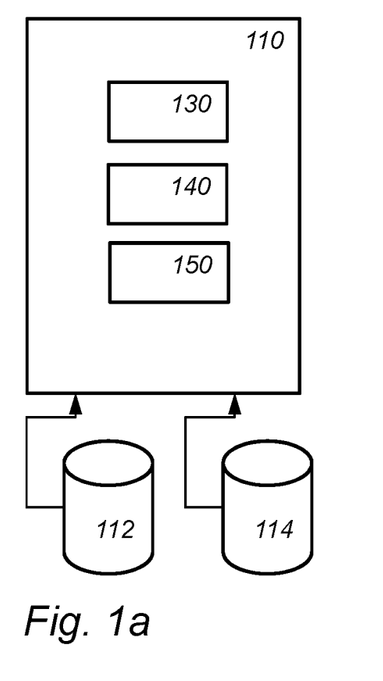
Figure 1B:
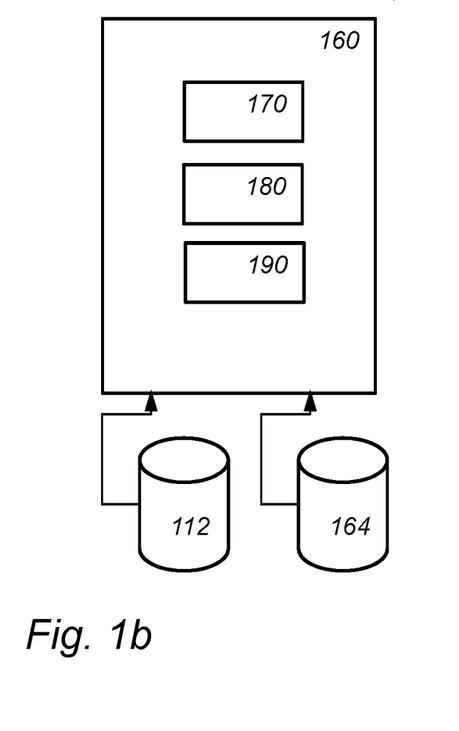

FIG. 1a schematically shows an example of an embodiment of a medical image segmentation system 110. For example, image segmentation system 110 may be configured for an image segmentation method such as shown herein. FIG. 1b schematically shows an example of an embodiment of an atlas images selecting system 160. For example, system 160 may be configured for a method of selecting atlas images as shown herein. For example, the atlas images that are selected in system 160 may be used in system 110 for image segmentation.

Medical image segmentation system 110 and atlas selection system 160 may be distinct systems. Medical image segmentation system 110 and atlas selection system 160 could be combined in a machine learning system 100. System 100 may be configured for atlas selection and for image segmentation. The latter may be part of segmentation function training and/or of segmentation on new images.

For example, medical image segmentation system 110 may be used in a production environment. For example, medical image segmentation system 110 may be used by medical professionals, or by operators of medical imaging systems, and the like, to produce segmentations of new images. The segmentation function in medical image segmentation system 110 and/or is typically a machine learning segmentation function, e.g., the segmentation function may be or may have been, trained on multiple training images. For convenience it will be assumed that the segmentation function is of machine learning type, but this is not strictly necessary. For example, a segmentation function which is hand-crafted, e.g., an expert system, or the like could also be improved according to an embodiment. A machine learning segmentation function may comprise a neural network, e.g., configured to receive an image as input and to produce a segmentation as output, but this is not necessary. For example, the segmentation function may comprise other machine learning functions, e.g., deep forests, or may comprise an ensemble of one or more machine learning functions. For example, atlas images selecting system 160 may be used when preparing the image segmentation system 110. For example, system 160 may be used together with a system for training the segmentation function of system 110. For example, system 160 may further be configured to train the parameters of the segmentation function that may be used in the image segmentation system 110. The latter is optional though, e.g., segmentation function training may be performed by a different device. In fact, it is an advantage that atlas images can be selected after the training of the segmentation function is complete. Interestingly, a fully trained segmentation function may be obtained from any source, e.g., from some third party, after which atlas images may be selected for it. In this way, accuracy and robustness of any existing segmentation function for image segmentation may be increased later. This holds even if the use of atlas images was not intended or anticipated during the design or training of the segmentation function.

Image segmentation system 110 may comprise a processor system 130, a memory 140, and a communication interface 150. Image segmentation system 110 may be configured to communicate with a segmentation function storage 112 and an atlas image storage 114.

Segmentation function storage 112 may be configured to store a segmentation function, the segmentation function being configured to receive a medical input image and to produce an image segmentation. Atlas storage 114 may be configured to store multiple atlas images.

Atlas image selection system 160 may comprise a processor system 170, a memory 180, and a communication interface 190. System 160 may comprise a segmentation function storage 112, e.g., as in system 110 and a test image storage 164.

Segmentation function storage 112 may be configured to store a segmentation function, the segmentation function being configured to receive a medical input image and to produce an image segmentation.

Test image storage 164 may be configured to store multiple test images and corresponding test image segmentations.

Storages 112, 114 and 164 may be a local storage of system 110 or 160, e.g., a local hard drive or memory. Storage 112, 114 and 164 may be non-local storage, e.g., cloud storage. In the latter case, storage 112, 114 and 164 may be implemented as a storage interface to the non-local storage.

Systems 110 and/or 160 may communicate with each other, external storage, input devices, output devices, and/or one or more sensors over a computer network. The computer network may be an internet, an intranet, a LAN, a WLAN, etc. The computer network may be the Internet. The systems comprise a connection interface which is arranged to communicate within the system or outside of the system as needed. For example, the connection interface may comprise a connector, e.g., a wired connector, e.g., an Ethernet connector, an optical connector, etc., or a wireless connector, e.g., an antenna, e.g., a Wi-Fi, 4G or 5G antenna.

The communication interfaces may be used to send or receive input images for segmentation, atlas images, segmentation function parameters, output images, etc.

The execution of systems 110 and 160 may be implemented in a processor system, e.g., one or more processor circuits, e.g., microprocessors, examples of which are shown herein. The system 110 may be implemented in a single device which may or may not include the storage parts. The system 160 may be implemented in a single device which may or may not include the storage. Systems 110 and 160 may be implemented in a single system or device, etc. Systems 110 and/or 160 may comprise functional units which may configured for elements, e.g., steps, or parts, etc., of embodiments of image segmentation methods and/or atlas selection methods. The functional units may be wholly or partially implemented in computer instructions that are stored at system 110 and 160, e.g., in an electronic memory of system 110 and 160, and are executable by a microprocessor of system 110 and 160. In hybrid embodiments, functional units are implemented partially in hardware, e.g., as coprocessors, e.g., segmentation function coprocessors, graphic coprocessors, etc., and partially in software stored and executed on system 110 and 160. Parameters of the segmentation function and/or training data may be stored locally at system 110 and 160 or may be stored in cloud storage.

Figure 2A:
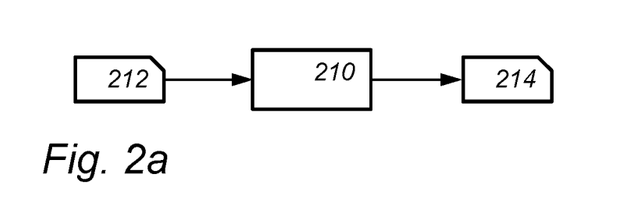

FIG. 2a schematically shows an example of an embodiment of a segmentation function 210 such as may be used in embodiments of image segmentation methods and/or in embodiments of atlas image selection methods. For example, segmentation function 210 may be configured to receive a medical input image 212 and to produce an image segmentation 214. For example, the segmentation function may be configured to receive a 2d or 3d image I and to produce an annotation, e.g., a segmentation A. The segmentation may be a binary image. For example, the image may be an image of a lung, and the segmentation may be a binary image that indicates whether or not a pixel/voxel of the input image corresponds to a lung or not. Segmentation function 210 may be trained or may have been trained on a set of images $I_1, I_2, \ldots, I_m$ with corresponding annotations $A_1, A_2, \ldots, A_m$. Training of a segmentation function may be done in a conventional manner. For example, a neural network may be trained, e.g., using backpropagation. Training may use an Adam optimizer.

Figure 2B:
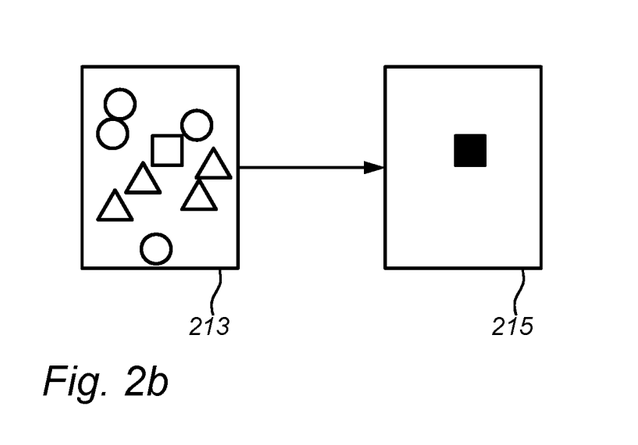

FIG. 2b schematically shows an example of an embodiment of an image segmentation. Shown in FIG. 2b is a medical image 213. Medical image 213 shows an object of interest, say, a lung, a kidney, a heart, etc., but also objects that are not of interest. In image 213 the object of interest is schematically indicated by a square. The segmentation 215 is in this case a binary image in which black pixels indicate the presence of the object of interest.

Instead of a binary image, the segmentation may also have more than two different classes, e.g., to indicate more than one object of interest. For example, the segmentation may be a two or three-dimensional array that indicates for pixels or voxels in the input to what object they belong. The size of the segmentation along its dimensions may be the same as of the input image, but it may also be lower; for example, one output element may classify multiple input elements, e.g., pixels/voxels. The size of the segmentation along its dimensions may be also be higher, e.g., shape-based interpolation may be used to upsample results.

In an embodiment, the input images may be an abdominal CT and the objects of interest may be liver, spleen, left and right kidney. The segmentation function may be a neural network, e.g., a deep convolutional neural networks (CNN), e.g., of U-type, or of F-type. A segmentation function may also be trained for other objects and image modalities, e.g., arteries, bones, etc., or MRI, x-ray, etc. The segmentation method may indicate common anatomical features of the medical image, e.g., anatomical features that are present for anatomically normal, e.g., average, persons. The segmentation method may also or instead indicate medical anomalies, e.g., a tumor, a bone fracture, etc.

Figure 3:
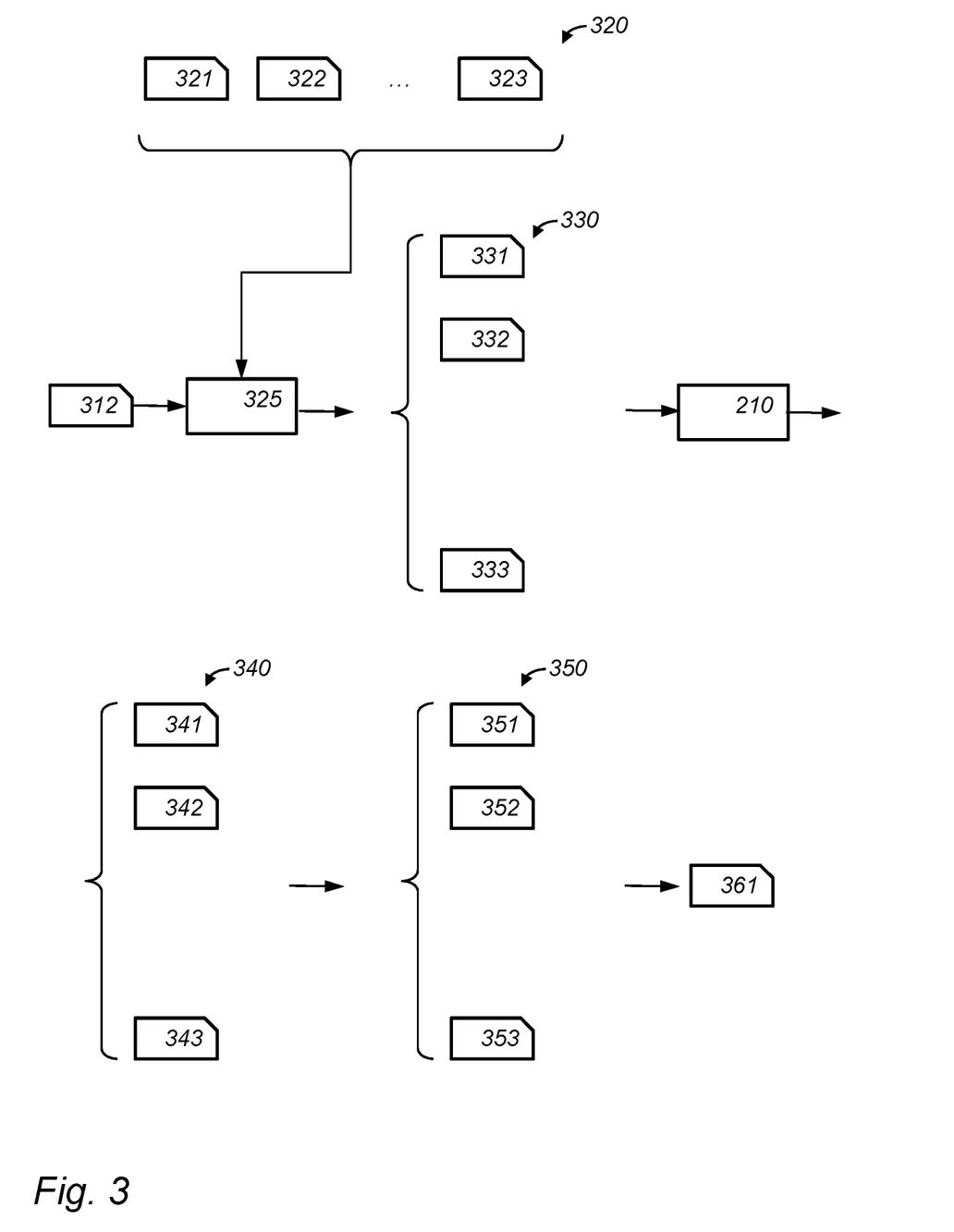
Figure 5A:
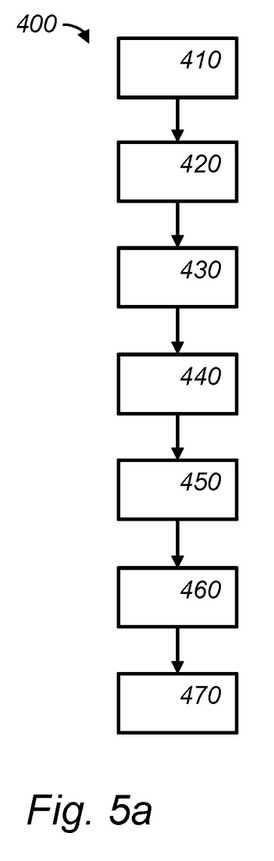

FIG. 3 schematically shows an example of an embodiment of a method for medical image segmentation. FIG. 5a schematically shows an example of an embodiment of a method 400 for medical image segmentation. FIG. 3 shows data structures and data items that may be used in method 400. On the other hand, the data structures and data items, etc. that are shown in FIG. 3 may be manipulated using an embodiment of method 400.

Method 400 may comprise obtaining 410 a segmentation function 210, the segmentation function being configured to receive a medical input image and to produce an image segmentation.

For example, the segmentation function 210 may be a convolutional network, or a ResNet type architecture, or the like. Obtaining the segmentation function may comprise retrieving the segmentation function from a storage, or receiving the segmentation function from a computer network, etc. The segmentation function may be represented as a collection of segmentation function parameters.

Typically, the segmentation function 210 is fully trained before atlas image selection, although this is not necessary. For example, after atlas selection the segmentation function may be further trained while input image registration is included. For example, this may be a fine-tuning. In fact, during training one may even perform multiple segmentation function applications to multiple registered input images, and fuse the resulting multiple segmentations, e.g., as in an embodiment, and compute an error signal from the final fused segmentation. The latter error signal may be used for further training, e.g., fine tuning. An advantage of this approach is that the segmentation function is optimized for use with the selected atlas images. This fine-tuning is however not needed; for example, one may use atlas selection as a way to boost a segmentation function's performance without having to further train it.

Method 400 may comprise obtaining 420 multiple atlas images 320. Shown in FIG. 3 are atlas images 321, 322 and 323. There may be more or fewer atlas images. For example, there may be 4 or more, 8 or more, 16 or more atlas images. The atlas images may have been selected according to a method for atlas image selection. For example, the atlas images may have been selected for various positive properties. For example, the atlas images may segment well. For example, the atlas images may represent a good cross section of the image population.

Method 400 may comprise receiving 430 a medical image 312. For example, the medical image may be obtained from a medical imaging device, e.g., a CT device, MRI device, x-ray device, and the like. For example, the image may be represented as a 2d-array of pixels, or a 3d-array of voxels. The image may be compressed, or may be in a raw format, etc.

Method 400 may comprise registering 440 the received image 312 to the multiple atlas images thus obtaining multiple registered images 330 and multiple corresponding registering transformations configured to register the received image on the multiple atlas images. FIG. 3 shows registered images 331, 332 and 333. For clarity, the corresponding transformations are not shown in FIG. 3. FIG. 3 shows a registering function 325 configured to register the image 312 on the atlas images 320.

Image registration is a process in which a source image is transformed to better align with a target image. In case of function 325, image 312 is the source image and the atlas images in turn function as target image. The registration function may be configured for selecting an allowable transformation from a defined class of transformations. For example, the class of transformations may be, e.g., translation registration, rigid registration, similarity registration, affine registration or non-rigid registration. A rigid transformation includes translation and rotation. A similarity transformation includes translation, rotation and scaling. The selection of the registration may be through optimizing a loss function.

For registration function 325 an elastic registration may be used. For example, a diffeomorphism may be selected by registration function 325. An elastic transformation allows a close alignment between source image and target image. Accordingly, it is expected that the segmentation qualities of the atlas images may be matched by the transformed images.

After registration of the single input 312, multiple registered images are obtained, e.g., one for each atlas image. When registering image 312 to an atlas image, the function 325 produces the registered image, but also the transformation that maps image 312 to the atlas image. For example, given an input image I, and atlas images $I_i$ the resulting transformations may be selected from the transformation class, so that $T_i(I)$ aligns with image $I_i$ at least to some extent.

Method 400 may comprise applying 450 the segmentation function 210 to the multiple registered images 330 thus obtaining multiple registered image segmentations 340. For example, a segmentation function NN may be applied as $NN(T_i(I))$, wherein i runs over the number of atlas images. The output of the segmentation function may be a 2 or 3 dimensional array of the same or smaller dimension of image 312. The elements of the array may indicate the segmentation determined by the segmentation function. A segmentation element may be a value indicating the type of the corresponding pixel/voxel, but may also be vector. For example, in case a segmentation into p objects is desired. The elements in the output array of the segmentation function may be p-dimensional vectors. Elements in the vector may indicate the found object. The sum of the vector may be 1, or scaled to 1, etc.

Method 400 may comprise applying 460 inverses of the multiple registering transformations to the multiple image segmentations 340 thus obtaining multiple image segmentations 350. For example, the method may compute $T_i^{-1}(NN(T_i(I)))$. If the size of the segmentation function inputs and outputs differ, then the inverse transformation $T_i^{-1}$ may have to be downsampled, to fit the smaller array. For example, the latter could be done by interpolation.

Method 400 may comprise determining 470 an output segmentation 361 from the multiple image segmentations. For example, the determining may comprise a majority voting. For example, the image segmentations 350 may comprise binary images; segmentation 316 may also comprise a binary image in which a pixels value may be determined by the value that occurs most often, in the corresponding pixel of the segmentations 350. The same approach may be used for multi-value images, instead of binary images. In case the segmentations 350 are arrays, e.g., 2d or 3d arrays, which contain p-dimensinal vectors, the corresponding vector-elements may be averaged according to some average function. For example, given a set of vectors $v_i$ which each correspond to the same elements, e.g., pixel, etc. of segmentations 350, one could determine the corresponding vector in segmentation 361 as $1/n\Sigma v_i$. Interestingly, a majority function may be approximated by using a power-average, e.g., a root-mean-square. For example, $$\sqrt[d]{1/n \sum v_i^d},$$

wherein the d-power is computed component wise. For example, one may select d≥2. Using higher values of d, e.g., 2 or higher has the advantage that a majority like determination is computed, while still allowing for multi-object segmentation using vectors instead of single-value classifiers.

As shown above, a segmentation function which has been trained for image segmentation, may be enhanced by registering an image toward atlas images. This has the advantage, that instead of a single segmentation, the segmentation function is forced to provide multiple segmentations. These segmentations are in essence for the same image, but this information is not available to the segmentation function.

Some types of segmentation functions may be invariant for some transformation. For example, if the segmentation function comprises a convolutional neural network, it may be invariant under translation, at least to some extent, however this will not hold for slightly more complicated transformations. In fact, a convolutional network will typically not even be invariant under rigid transformations, let alone, elastic transformations, such as a diffeomorphic transformation. Thus, if an image 312 happens to fall in a failure mode of segmentation function 210, this is likely not true for a registered version of image 312, and even less likely to occur for the majority of the registered images 330.

In an embodiment, the segmentation function is not invariant under the transformation class used to determine registration quality and/or used for image segmentation. For example, in an embodiment, the segmentation function is invariant under a first set of transformations, and a second set of transformations is used to determine registration quality and/or used for image segmentation, wherein the second set is larger than the first set, e.g., the first set is a subset of the second set. For example, in an embodiment, the segmentation function comprises a convolutional neural network, and the transformations used to determine registration quality and/or for image segmentation is larger than the set of transformation, e.g., comprises also rotations. For example, suppose the probability is about 5% that an image 312 will be mis-segmented, and 10 atlas images are used, then the probability that a majority will be mis-segmented is about:

$$1 - \sum_{i=6}^{10} \binom{10}{i}(0.95)^i(0.05)^{10-i} = 0.00006.$$

The latter is a far smaller value. The above computation assumes independence between the various applications of the segmentation function, but a main cause of dependence between the multiple segmentation obtained from the segmentation function are caused by imaging failures. For example, if the input image is of very low quality, e.g., caused by failure of the imaging device, then any application of the segmentation function may fail for any registration. However, such a failure mode can be ascribed to different causes than to the segmentation function technology. The number of ten atlas images above is an example. A reduction in failure probability may also be obtained with fewer atlas images.

Atlas images could be selected from the images on which the segmentation function was trained. For example, one could select the atlas images at random. Selecting the atlas images from training images has the advantage that the segmentation function is likely familiar with those images. However, better results may be achieved with a more careful selection, e.g., as described herein.

Figure 4A:
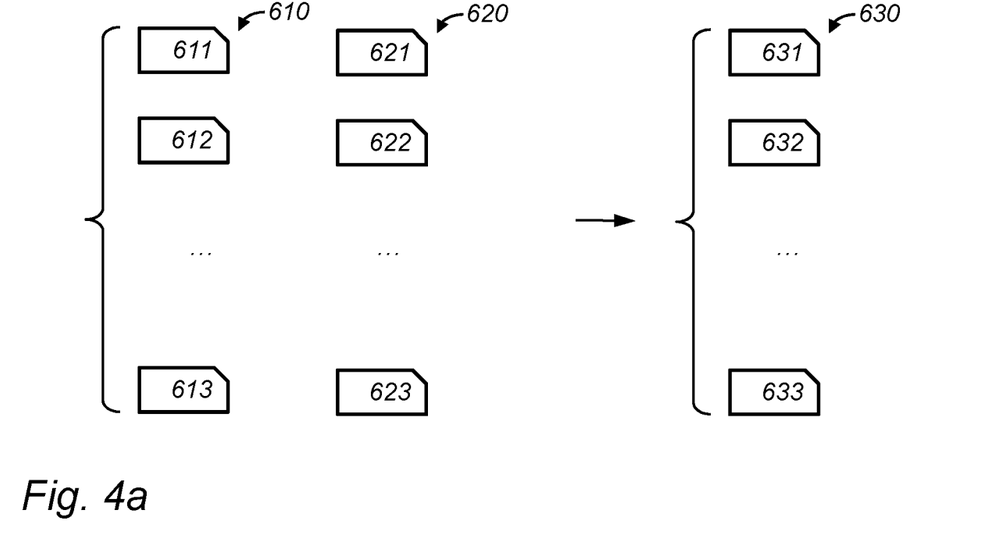
Figure 5B:
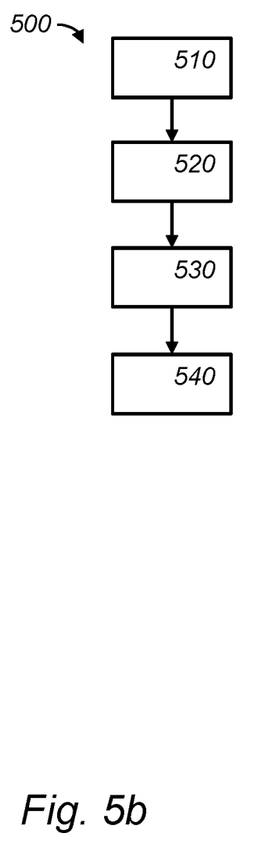

FIG. 4a schematically illustrates an example of an embodiment of a method for selecting atlas images for use in a medical image segmentation method. FIG. 5b schematically shows an example of an embodiment of a method 500 for selecting atlas images for use in a medical image segmentation method. The atlas images may be selected for a method such as method 400.

For example, method 500 may use the data items and structures shown in FIG. 4a and vice versa. Method 500 may also use the data shown in FIG. 4b which is described below.

Method 500 may comprise obtaining 510 a segmentation function 210 configured to receive an input image and to produce an image segmentation. The segmentation function 210 may be same as the segmentation function that will be used in production use. As above, the segmentation function may comprise a neural network, e.g., a U or F net, CNN, etc., may be used.

Method 500 may comprise obtaining 520 multiple test images 610 and corresponding test image segmentations 620. For example, the multiple test images 610 may be obtained from the training of segmentation function 210. For example, segmentation function 210 may be trained on multiple pairs of a training image and a training image segmentation. For example back propagation methods may be used to train a neural network on the training set. Typically, some set of images is kept aside for testing purposes, e.g., to test convergence of the segmentation function. The test images 610 may be obtained from the images used for training and/or from those used for testing the segmentation function. It is preferred that test images 610 are obtained from the same or a similar image distribution from which the images were drawn on which the segmentation function is trained.

Test images 610 may be all images on which segmentation function 210 was trained and/or tested, especially if these were relatively few images, e.g., less than a 100 or so. Test images 610 may also be a subset, e.g., a random selection of the images used for training and/or testing. The latter is useful if the number of training/testing images was large.

Method 500 may comprise determining 530 a segmentation quality 630 for the multiple test images by comparing the associated test image segmentation 620 with an image segmentation generated by the segmentation function. For example, the test images 610 may have an associated segmentation, e.g., a ground truth segmentation 620. The latter may have been used in training or testing as well. There are several ways to compute a segmentation quality. One way to do so, is to compute a Dice score between the ground truth image segmentation and the segmentation produced by the segmentation function. For example, a segmentation quality may be obtained for image 611 by computing a Dice score between segmentation 621 and segmentation 631. A high Dice score indicates a good overlap, and thus a high segmentation quality.

Method 500 may comprise selecting 540 one or more of the test images as atlas images having a segmentation quality over a threshold. For example, a Dice score over a threshold may be required, e.g., a Dice score over 0.8. The threshold may be predetermined. The threshold may be dynamic. For example, the atlas images may be selected from the best performing images. For example, a percentage of the worst scoring images may be discarded.

The inventors found that in practice most images perform well in segmentation but some percentage, say about 5% of the images show a worse segmentation that most images. By selecting the atlas images from the best performing 95% or 90% or 80%, or the like, of the images, it is avoided that an input image 312 is registered on an image for which the segmentation function performs bad, and thus making it more likely that the segmentation function would also perform bad on the registered image.

For example, in an embodiment, a worst performing part is discarded of the images 610, e.g., the bottom 5%. The atlas images may then be selected from the remaining images; this may be done at random, e.g., selecting 10 images at random.

Additional criteria may be imposed on selecting the atlas images, e.g., in addition to segmentation quality; or possibly instead of segmentation quality.

Figure 2C:
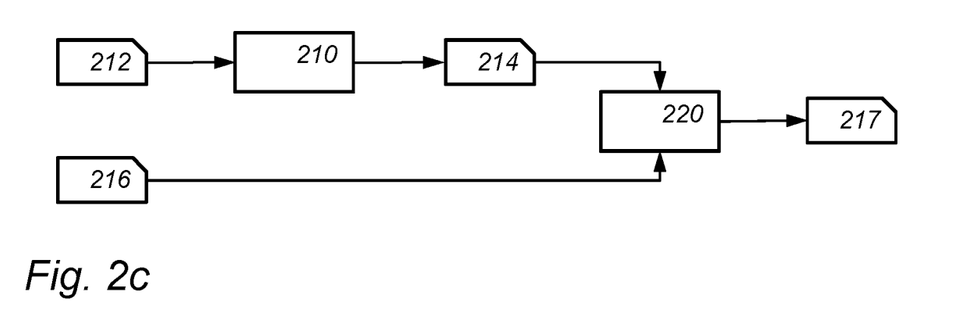

FIG. 2c schematically shows an example of an embodiment of a segmentation quality determination. Shown is an image 212 with an associated true image segmentation, e.g., a ground truth segmentation. The image 212 is segmented by segmentation function 210 to obtain a generated image segmentation 214. Generated image segmentation 214 and true image segmentation 216 may then be compared, e.g., using a comparator 220 to obtain a segmentation quality 217. For example, comparator 220 may compute a Dice score.

Figure 4B:
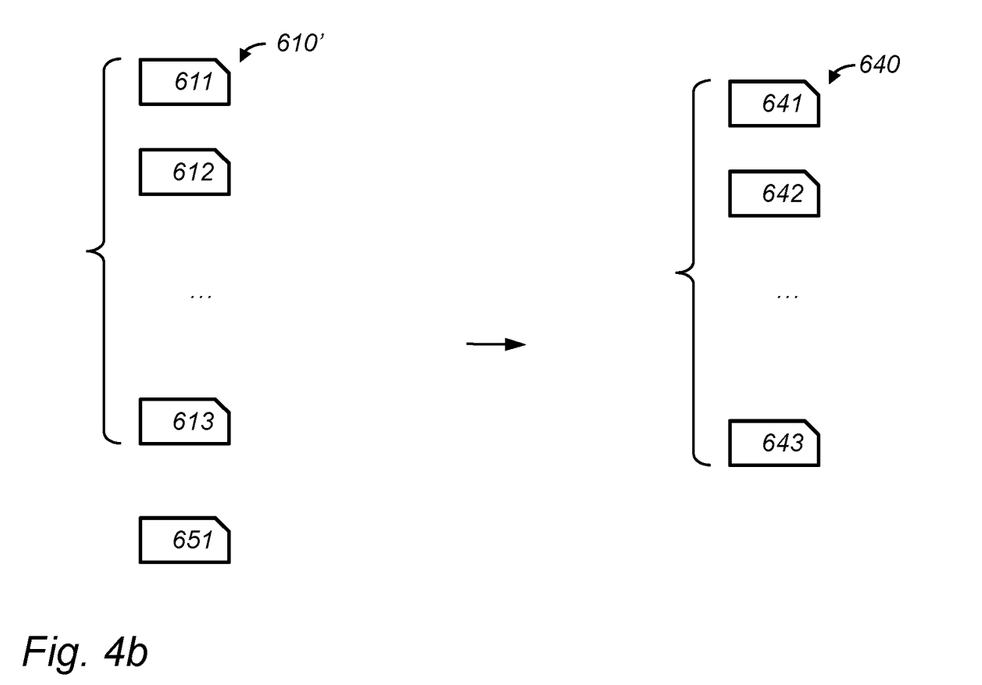

FIG. 4b schematically illustrates an example of an embodiment of a method for selecting atlas images for use in a medical image segmentation method. Shown in FIG. 4b are images 610' that have not yet been selected as atlas image, and which have not been discarded yet for other reasons, e.g., for having a too poor segmentation quality. Also shown in FIG. 4b is an image 651 which has already been selected as atlas image. For example, image 651 may have been selected as having a best segmentation quality, or may have been selected at random from images having a good segmentation quality.

A registration function is applied to the images 610' on the selected image 651. A registration quality is obtained by comparing the registered test image to the selected test image 651. In this way registration qualities 640 are obtained. The comparing may use comparator 220, e.g., a Dice score. Other similarity measures may be used instead of a Dice score, e.g., correlation.

Interestingly, and different from the segmentation quality, an atlas image may be selected which has low registration quality. A low registration quality indicates that the image is quite different from the images that are already selected as atlas image. For example, the image may have the lowest registration score. For example, the image with the best registration quality may be discarded and one or more random images may then be selected. For example, the images may be selected from the 50% of the images having the lowest registration quality.

In an embodiment, the registration performed in method 400, e.g., in registration function 325 may select the registration from the same class of transformations as the registration done to compute the registration quality. In particular, the registration type for atlas image selection and form image segmentation may be translation-only, e.g., shifting, rigid, similarity, affine or non-rigid, e.g., elastic, e.g., a diffeomorphic transformation. While the latter transformation may be non-elastic or at least much less elastic.

Interestingly, it is possible for the registration performed in method 400, e.g., in registration function 325 may select the registration from a different, e.g., larger class of transformations than the registration done to compute the registration quality. In particular, the former may be an elastic registration, e.g., a diffeomorphic transformation. While the latter transformation may be non-elastic or at least much less elastic. For example, one could use rigid registrations to compute registration quality. A rigid transformation only allows transformations and rotations. A somewhat larger class may be allowed, e.g., transformations, rotations and scaling, or affine transformations.

An elastic registration in method 400 allows an image to match an atlas image as close as possible, and thus obtain a segmentation quality that is comparable to that of the atlas image. On the other hand rigid transformation allow a better variety of images to be found, as elastic registrations would make images look too much alike.

In FIG. 4*b* multiple test images are compared to a single atlas image. For example, one may use this to select the second atlas image after the first atlas image has been selected only on the basis of segmentation quality. For example, this may be used add an atlas image that is different in registration terms from a particular previously selected atlas image. The latter atlas image may be randomly selected from the already selected atlas images, or, for example, one may iteratively use each selected images one by one, etc.

Another approach is to compare the test image 610' not with a single selected atlas image 651 but with multiple atlas images, and even with all atlas images that have so far been selected. For example, one may compute a registration quality between test images 610' and the atlas images selected so far. One can then determine an overall registration quality for the test images 610'. The latter may for example, be an average of the registration qualities. A high average indicates that registration quality is often high. Instead of an arithmetic average a power arithmetic may be used, this emphasizes atlas images that are very different to some, even if similar to most. Selecting a further atlas image with a low overall registration quality is more likely to give an independent segmentation by the segmentation function. On the other hand, if the further atlas image has a high segmentation quality, the segmentation function is likely to perform well on in it.

Selecting on the basis of overall registration may be done by discarding images that are too similar and selecting at random from the rest. Other selecting methods, e.g., as indicated herein are possible as well.

For example, one may use the following procedure
1. Select a random pool of test images, e.g., 100 or 1000 training images that have an associated true segmentation.
2. Discard a % of the pool with worst segmentation quality. For example, a may be 5%.
3. Select a random atlas image from the current pool and remove the selected image from the pool.
4. Compute an overall registration quality for the pool of test images compared to selected atlas images
5. Discard images from the pool with too high overall registration quality.
6. Unless the pool is empty or a sufficient number of atlas images have been selected go to part 3.

Step 2 may use an absolute score instead of a relative score. For example, images with a Dice score below 0.8 between generated segmentation and true segmentation may be discarded.

Step 4 may be performed efficiently, since registration quality between an individual test image and an atlas image may be stored, and need not be computed again. Thus, if a single atlas image is added only registration qualities between the test images and the added atlas image need to be computed.

Step 5 may remove b %, say also 5% or somewhat higher, e.g., 25% of the pool. But instead of a fixed percentage also an absolute threshold may be used. The absolute threshold may be determined empirically.

Instead of random selection, e.g., in step 3 one may also select images with the best segmentation quality and/or worst registration quality or combination thereof, e.g., the sum or the like. The above atlas image selection algorithm is an example, but different embodiments are possible.

In general, the bounds for segmentation quality and/or registration quality, whether absolute or relative, may depend on the difficulty of the segmentation problem, the quality of the segmentation function, e.g., the amount of training data, the acceptance of false positives, and so on. If the segmentation function comprises a neural network, its quality may be dependent on its depth. Bounds may be established empirically by keeping a set of training images apart as test data and evaluating the resulting segmentation system. In the various embodiments of system 110 and 160, the communication interfaces may be selected from various alternatives. For example, the interface may be a network interface to a local or wide area network, e.g., the Internet, a storage interface to an internal or external data storage, a keyboard, an application interface (API), etc.

The systems 110 and 160 may have a user interface, which may include well-known elements such as one or more buttons, a keyboard, display, touch screen, etc. The user interface may be arranged for accommodating user interaction for configuring the systems, training the segmentation functions on a training set, or applying the system to new image data, or selecting atlas images, etc.

Storage may be implemented as an electronic memory, say a flash memory, or magnetic memory, say hard disk or the like. Storage may comprise multiple discrete memories together making up storage 140, 180. Storage may comprise a temporary memory, say a RAM. The storage may be cloud storage.

System 110 may be implemented in a single device. System 160 may be implemented in a single device. Typically, the system 110 and 160 each comprise a microprocessor which executes appropriate software stored at the system; for example, that software may have been downloaded and/or stored in a corresponding memory, e.g., a volatile memory such as RAM or a non-volatile memory such as Flash. Alternatively, the systems may, in whole or in part, be implemented in programmable logic, e.g., as field-programmable gate array (FPGA). The systems may be implemented, in whole or in part, as a so-called application-specific integrated circuit (ASIC), e.g., an integrated circuit (IC) customized for their particular use. For example, the circuits may be implemented in CMOS, e.g., using a hardware description language such as Verilog, VHDL, etc. In particular, systems 110 and 160 may comprise circuits for the evaluation of segmentation functions.

A processor circuit may be implemented in a distributed fashion, e.g., as multiple sub-processor circuits. A storage may be distributed over multiple distributed sub-storages. Part or all of the memory may be an electronic memory, magnetic memory, etc. For example, the storage may have volatile and a non-volatile part. Part of the storage may be read-only.

In an embodiment, test-time data augmentation is included, e.g., in method 400. The segmentation function, e.g., segmentation function 210, may use a conventional segmentation function training; for example, the segmentation function may be configured for a conventional machine learning algorithm. For example, the machine learning algorithm may be decision forests. For example, the machine learning algorithms may be a neural network. For example, the segmentation function may comprise a neural network, e.g., a convolutional neural network (CNN) like a U-net or an F-net, etc. Atlas images may be selected from the training images. Below several further optional refinements, details, and embodiments are illustrated.

In an embodiment, n≥2 atlas images are used, say n=10, etc. A new image for segmentation may be registered to the n atlases resulting in n invertible transformations. The segmentation function, e.g., the CNN, is applied to each of the n transformed images resulting in n annotation images, e.g., segmentation images. The inverse transformation resulting from registration is applied to the annotation images, and the labels of transformed annotation images are fused to obtain a final segmentation.

The basic idea may also be applied more generally to other tasks like image classification (for example, using a ResNet-type neural network architecture). In this case the inverse transformation step after application of the segmentation function can be skipped. The segmentation function training may use a set of m 2D or 3D images $I_1, \ldots, I_m$ with corresponding annotations $A_1, \ldots, A_m$. Training of a 2D/3D segmentation function for image segmentation can be done as conventional. For example, a neural network may be trained, e.g., using backpropagation, e.g., using the Adams optimizer. The m images together with the corresponding annotations may altogether be used for segmentation function training or subdivided into a training and a test set.

Atlas selection may select a subset n (≤m) of the m images as atlases. The individual images used as atlases might be selected using various criteria. One criterion can be the segmentation quality observed during training (e.g. Dice score of the image after training when being part of the training data). Another criterion can be the segmentation quality observed during testing (e.g. Dice score of the image after training when being part of the test data). Another criterion can be the difference of images. For instance, rigid registration may be applied to the training images (e.g. to atlas candidates) and subsequently the candidate with the least mutual annotation overlap in terms of Dice score after registration to the already chosen candidates may be selected, and this process may be repeated iteratively to select n atlas images.

For image-to-atlas registration and image transformation, there have been a large number of algorithms presented and applied to medical image registration. Recently also registration algorithms have been used that exploit deep learning and neural networks. An algorithm resulting in a diffeomorphic transformation has the advantage that the inverse transformation can be obtained easily. Depending on the images to be handled, a similarity measure suitable for the registration of images of the same modality like cross-correlation or for the registration of images of different types like mutual information can be used. Application of the (non-rigid) registration algorithm to an image $I_{new}$ and the atlas images $I_1, \ldots, I_n$ results in n transformations $T_1, \ldots, T_n$ that transform the new image into the space of the corresponding atlas, e.g., as $T_i(I_{new})$.

In case that an atlas image has a larger Field-of-View than the new image to be segmented, the atlas image can be used to complement the Field-of-View of the new image.

In addition to a spatial image transformation, the image gray-values of the new image $I_{new}$ may also be transformed to better represent the atlas images. This transformation may be included in transform $T_i$. For instance, a parametric transformation may be applied to the intensities; the parameters may be determined so that the resulting histogram of the new image after intensity transformation corresponds to the atlas image.

The transformed images $T_1(I_{new}), \ldots, T_n(I_{new})$, e.g., the multiple registered images may be segmented using a previously trained segmentation function resulting in annotations $A_{1,new}, \ldots, A_{n,new}$. After segmentation the annotations may be transformed back into the space of the new image resulting in the annotations $T_1^{-1}(A_{1,new}), \ldots, T_n^{-1}(A_{n,new})$. Segmentation functions can be implemented using, for instance, a neural network, e.g., U-Net or F-Net architectures, but are not restricted to any specific type of network. Other neural networks can be utilized instead.

Label fusion: Given the annotations $T_1^{-1}(A_{1,new}), \ldots, T_n^{-1}(A_{n,new})$, a final annotation of the new image can be constructed, for instance, by majority voting; for example, to each voxel at position x the label may be assigned that corresponds to the most frequent label at position x in the annotations to be fused. Other label fusion techniques can be used alternatively. In an embodiment, information about the fusing, e.g., voting, may be used for further processing or display to the user. For example, a second, or top-k, label may be displayed, so that the operator know what a likely second option was. The latter may be used for quick feedback. For example, when an operator encounters a mis-segmentation, but, as is likely the second, or a top-k option was correct, then this information may be provided, say using an input device of the segmentation device. For example, the operator can use a mouse or the like to indicate that particular object or pixel/voxel belongs to the second most frequent label, etc. This information can later be used for retraining or fine-tuning the segmentation function.

Figure 6A:
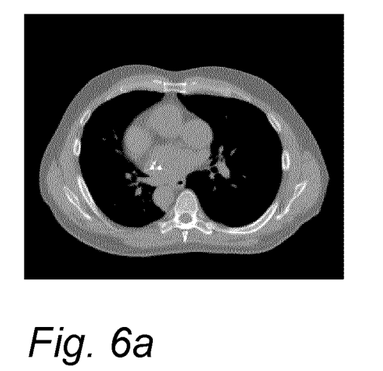
Figure 6B:
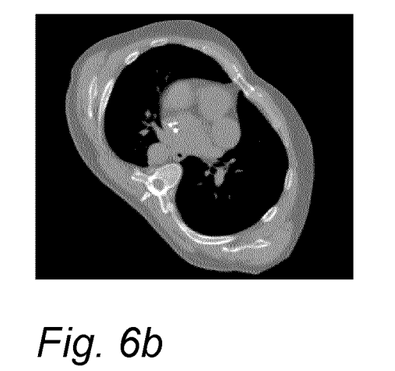
Figure 6C:
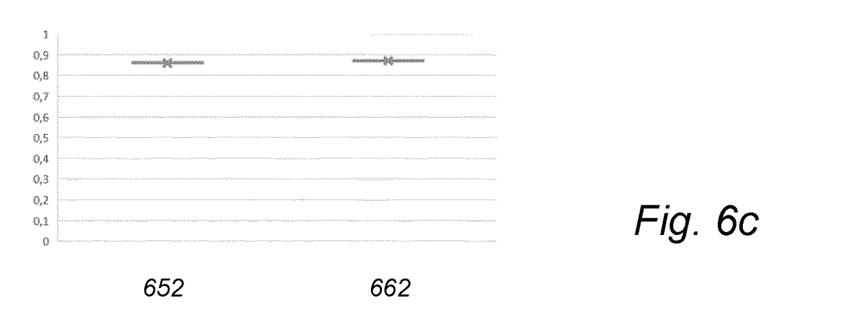

An embodiment is illustrated using the example of rib and spinal column segmentation in 3D CT images; FIG. 6a shows a visual representation of such a CT-scan. In particular, an F-net neural network has been trained to address this task. The image of FIG. 6a is segmented using the segmentation function comprising the neural network and a Dice score between the segmentation function output and an expert segmentation has been computed. The diagram of FIG. 6c shows the Dice score for the spine at 652 and for ribs at 662. Note that both scores are high which indicates that the segmentation function performs well on the image of FIG. 6a.

Figure 6D:
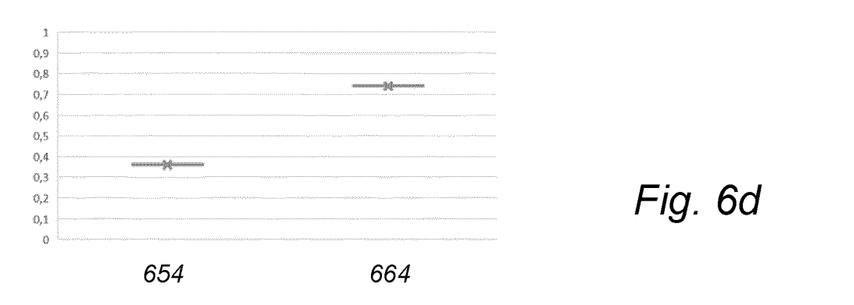

During training of the neural network in the segmentation function, data augmentation was used; in this case rotations of up to 7° of the CT data set. Accurate outputs are expected from the segmentation function across this range. FIG. 6b shows the same image as FIG. 6a, but with a considerably differently orientation; here, a rotation of 45°. Note that apart from this rotation, the images are the same. When the segmentation function is applied to the FIG. 6b, the resulting Dice scores are substantially smaller. The diagram of FIG. 6d shows the Dice score for the spine at 654 and for ribs at 664. Note that both scores are lower, which indicates that the segmentation function is not performing well on the image of FIG. 6b. Note that the score for the spine is about half the previous value, indicating a collapse of predictive ability for the spine object in this case.

Even rigid registration for FIG. 6b to an atlas image like that of FIG. 6a would return the segmentation capabilities of the segmentation function. More subtle predictive collapse, e.g., cause by unusual anatomical variations can be addressed with non-rigid registration. Applying the segmentation function to the transformed versions of the test image label fusion improves the segmentation results.

For example, a segmentation function, atlas images or test images may be obtained from an electronic storage system, which may internal, or which may be external, e.g., addressed over a computer cable, or computer network, etc. The segmentation function may be trained on images, e.g., medical images that may be obtained from a medical imaging device, e.g., a CT scanner, etc. Receiving a medical image for segmentation may be done in the same way as the obtaining above. The receiving may be over an API, or other interface, which may be internal or external. The image may be received in a medical terminal from the imaging device. Registering the image, determining a registration or segmentation quality, etc., may be done in an electronic device, such as a computer. A neural network for a segmentation function, either during training and/or during applying may have multiple layers, which may include, e.g., convolutional layers and the like. For example, a neural network in the segmentation function may have at least 2, 5, 10, 15, 20 or 40 hidden layers, or more, etc. The number of neurons in the neural network may, e.g., be at least 10, 100, 1000, 10000, 100000, 1000000, or more, etc.

Many different ways of executing the method herein, e.g., method 400 and/or 500, are possible, as will be apparent to a person skilled in the art. For example, the steps can be performed in the shown order, but the order of the steps may also be varied or some steps may be executed in parallel. Moreover, in between steps other method steps may be inserted. The inserted steps may represent refinements of the method such as described herein, or may be unrelated to the method. Some parts may be executed, at least partially, in parallel. Moreover, a given part may not have finished completely before a next step is started.

Embodiments of the method may be executed using software, which comprises instructions for causing a processor system to perform method 400 and/or 500. Software may only include those steps taken by a particular sub-entity of the system. The software may be stored in a suitable storage medium, such as a hard disk, a floppy, a memory, an optical disc, etc. The software may be sent as a signal along a wire, or wireless, or using a data network, e.g., the Internet. The software may be made available for download and/or for remote usage on a server. Embodiments of the method may be executed using a bitstream arranged to configure programmable logic, e.g., a field-programmable gate array (FPGA), to perform the method.

It will be appreciated that the presently disclosed subject matter also extends to computer programs, particularly computer programs on or in a carrier, adapted for putting the presently disclosed subject matter into practice. The program may be in the form of source code, object code, a code intermediate source, and object code such as partially compiled form, or in any other form suitable for use in the implementation of an embodiment of the method. An embodiment relating to a computer program product comprises computer executable instructions corresponding to each of the processing steps of at least one of the methods set forth. These instructions may be subdivided into subroutines and/or be stored in one or more files that may be linked statically or dynamically. Another embodiment relating to a computer program product comprises computer executable instructions corresponding to each of the devices, units and/or parts of at least one of the systems and/or products set forth.

Figure 7A:
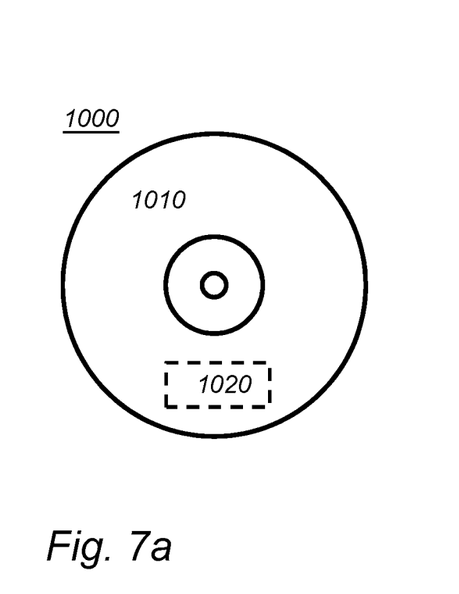

FIG. 7a shows a computer readable medium 1000 having a writable part 1010 comprising a computer program 1020, the computer program 1020 comprising instructions for causing a processor system to perform a segmentation method and/or atlas selection method, according to an embodiment. The computer program 1020 may be embodied on the computer readable medium 1000 as physical marks or by magnetization of the computer readable medium 1000. However, any other suitable embodiment is conceivable as well. Furthermore, it will be appreciated that, although the computer readable medium 1000 is shown here as an optical disc, the computer readable medium 1000 may be any suitable computer readable medium, such as a hard disk, solid state memory, flash memory, etc., and may be non-recordable or recordable. The computer program 1020 comprises instructions for causing a processor system to perform said segmentation method and/or atlas selection method.

Figure 7B:
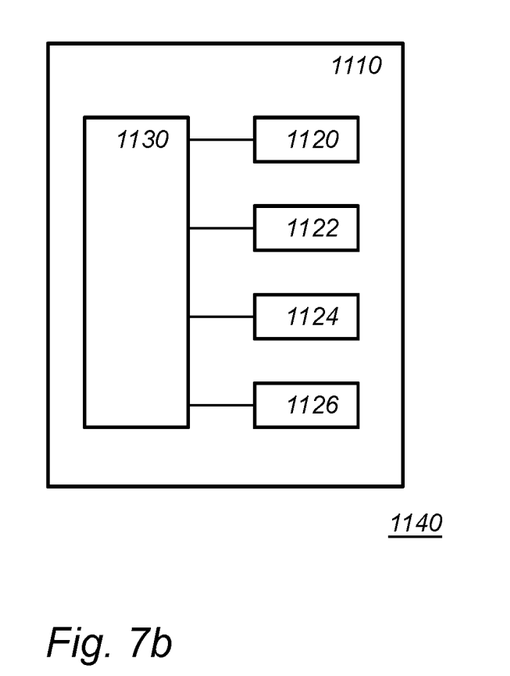

FIG. 7b shows in a schematic representation of a processor system 1140 according to an embodiment of a segmentation device and/or system and/or of an atlas selection device and/or system. The processor system comprises one or more integrated circuits 1110. The architecture of the one or more integrated circuits 1110 is schematically shown in FIG. 7b. Circuit 1110 comprises a processing unit 1120, e.g., a CPU, for running computer program components to execute a method according to an embodiment and/or implement its modules or units. Circuit 1110 comprises a memory 1122 for storing programming code, data, etc. Part of memory 1122 may be read-only. Circuit 1110 may comprise a communication element 1126, e.g., an antenna, connectors or both, and the like. Circuit 1110 may comprise a dedicated integrated circuit 1124 for performing part or all of the processing defined in the method. Processor 1120, memory 1122, dedicated IC 1124 and communication element 1126 may be connected to each other via an interconnect 1130, say a bus. The processor system 1110 may be arranged for contact and/or contact-less communication, using an antenna and/or connectors, respectively.

For example, in an embodiment, processor system 1140, e.g., the segmentation device and/or system and/or atlas selection device and/or system may comprise a processor circuit and a memory circuit, the processor being arranged to execute software stored in the memory circuit. For example, the processor circuit may be an Intel Core i7 processor, ARM Cortex-R8, etc. In an embodiment, the processor circuit may be ARM Cortex MO. The memory circuit may be an ROM circuit, or a non-volatile memory, e.g., a flash memory. The memory circuit may be a volatile memory, e.g., an SRAM memory. In the latter case, the device may comprise a non-volatile software interface, e.g., a hard drive, a network interface, etc., arranged for providing the software.

While device 1100 is shown as including one of each described component, the various components may be duplicated in various embodiments. For example, the processor 1120 may include multiple microprocessors that are configured to independently execute the methods described herein or are configured to perform steps or subroutines of the methods described herein such that the multiple processors cooperate to achieve the functionality described herein. Further, where the device 1100 is implemented in a cloud computing system, the various hardware components may belong to separate physical systems. For example, the processor 1120 may include a first processor in a first server and a second processor in a second server.

It should be noted that the above-mentioned embodiments illustrate rather than limit the presently disclosed subject matter, and that those skilled in the art will be able to design many alternative embodiments.

In the claims, any reference signs placed between parentheses shall not be construed as limiting the claim. Use of the verb 'comprise' and its conjugations does not exclude the presence of elements or steps other than those stated in a claim. The article 'a' or 'an' preceding an element does not exclude the presence of a plurality of such elements. Expressions such as "at least one of" when preceding a list of elements represent a selection of all or of any subset of elements from the list. For example, the expression, "at least one of A, B, and C" should be understood as including only A, only B, only C, both A and B, both A and C, both B and C, or all of A, B, and C. The presently disclosed subject matter may be implemented by hardware comprising several distinct elements, and by a suitably programmed computer. In the device claim enumerating several parts, several of these parts may be embodied by one and the same item of hardware. The mere fact that certain measures are recited in mutually different dependent claims does not indicate that a combination of these measures cannot be used to advantage.

In the claims references in parentheses refer to reference signs in drawings of exemplifying embodiments or to formulas of embodiments, thus increasing the intelligibility of the claim. These references shall not be construed as limiting the claim.

The invention claimed is:

1. A method for medical image segmentation, the method comprising:
    obtaining a segmentation function, the segmentation function being configured to receive a medical input image and to produce an image segmentation,
    obtaining multiple test images and associated test image segmentations,
    determining a segmentation quality for the multiple test images by comparing the associated test image segmentations with an image generated by the segmentation function,
    selecting a plurality of the multiple test images having the segmentation quality over a threshold as multiple atlas images,
    obtaining the multiple atlas images,
    receiving a medical image,
    registering the received image to the multiple atlas images thus obtaining multiple registered images and multiple corresponding registering transformations configured to register the received image on the multiple atlas images,
    applying the segmentation function to the multiple registered images thus obtaining multiple registered image segmentations,
    applying inverses of the multiple registering transformations to the multiple image segmentations thus obtaining multiple image segmentations, and
    determining an output segmentation from the multiple image segmentations.

2. The method of claim 1, wherein the segmentation function is a machine learning function which has been trained on multiple training images and corresponding training image segmentations, and wherein an atlas image has been selected from the multiple training images.

3. The method of claim 1, wherein determining at least one of the segmentation quality or registration quality comprises determining a Dice score.

4. The method of claim 1, wherein the segmentation function has been trained on multiple training images, the multiple test images being comprised in the multiple training images.

5. The method of claim 1, wherein the segmentation function is a neural network.

6. A medical image segmentation system, comprising:
    a segmentation function storage configured to store a segmentation function configured to receive a medical input image and to produce an image segmentation,
    atlas storage configured to store multiple atlas images
    a communication interface configured to receive a medical image,
    a processor system configured to:
        obtain multiple test images and associated test image segmentations,
        determine a segmentation quality for the multiple test images by comparing the associated test image segmentations with an image generated by the segmentation function,
        selecting a plurality of the multiple test images having the segmentation quality over a threshold as the multiple atlas images,
        register the received image to the multiple atlas images thus obtaining multiple registered images and multiple corresponding registering transformations configured to register the received image on the multiple atlas images,
        apply the segmentation function to the multiple registered images thus obtaining multiple registered image segmentations,
        apply inverses of the multiple registering transformations to the multiple image segmentations thus obtaining multiple image segmentations, and
        determine an output segmentation from the multiple image segmentations.

7. The system of claim 6, wherein the segmentation function is a machine learning function which has been trained on multiple training images and corresponding training image segmentations, and wherein an atlas image has been selected from the multiple training images.

8. The system of claim 6, wherein determining at least one of the segmentation quality or registration quality comprises determining a Dice score.

9. The system of claim 6, wherein the segmentation function has been trained on multiple training images, the multiple test images being comprised in the multiple training images.

10. The system of claim 6, wherein the segmentation function is a neural network.

11. A non-transitory computer readable medium storing instructions that, when executed by one or more processors, cause the one or more processors to:
    obtain a segmentation function configured to receive a medical input image and to produce an image segmentation;
    obtain multiple test images and associated test image segmentations,
    determine a segmentation quality for the multiple test images by comparing the associated test image segmentations with an image segmentation generated by the segmentation function,
    select a plurality of the multiple test images having the segmentation quality over a threshold, as multiple atlas images,
    obtain the multiple atlas images;
    receive a medical image;
    register the received image to the multiple atlas images thus obtaining multiple registered images and multiple corresponding registering transformations configured to register the received image on the multiple atlas images;

apply the segmentation function to the multiple registered images thus obtaining multiple registered image segmentations;

apply inverses of the multiple registering transformations to the multiple image segmentations thus obtaining multiple image segmentations; and determine an output segmentation from the multiple image segmentations.

12. The non-transitory computer readable medium of claim 11, wherein the segmentation function is a machine learning function which has been trained on multiple training images and corresponding training image segmentations, and wherein an atlas image has been selected from the multiple training images.

13. The non-transitory computer readable medium of claim 11, wherein determining at least one of the segmentation quality or registration quality comprises determining a Dice score.

14. The non-transitory computer readable medium of claim 11, wherein the segmentation function has been trained on multiple training images, the multiple test images being comprised in the multiple training images.

15. The non-transitory computer readable medium of claim 11, wherein the segmentation function is a neural network.

* * * * *